J. F. HUCKEL.
VENDING TRUCK.
APPLICATION FILED AUG. 6, 1915.
1,210,805. Patented Jan. 2, 1917.
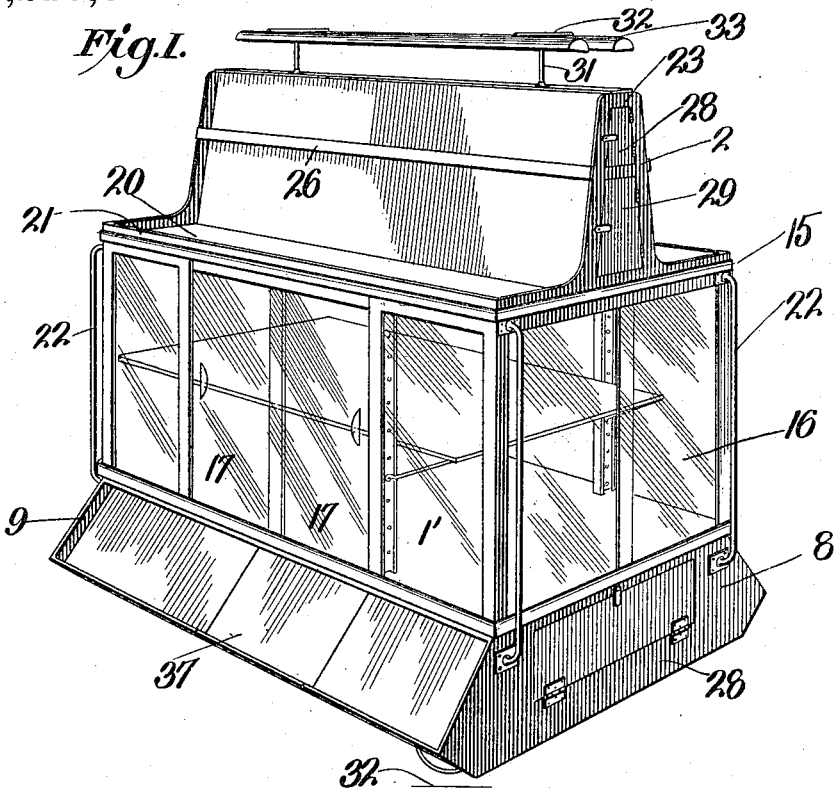
Fig. I.
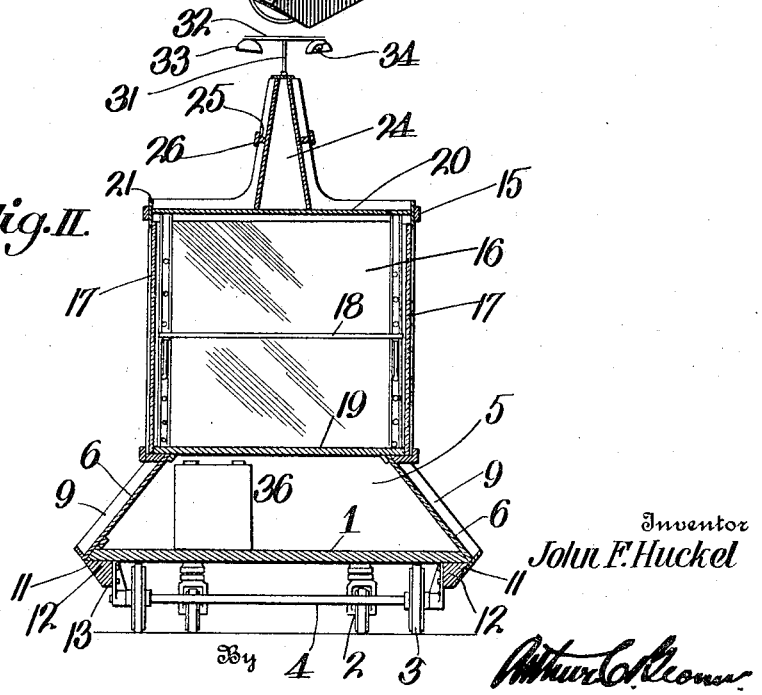
Fig. II.
Inventor
John F. Huckel
By Arthur C. Clowes
Attorney

UNITED STATES PATENT OFFICE.

JOHN F. HUCKEL, OF KANSAS CITY, MISSOURI.

VENDING-TRUCK.

1,210,805.  Specification of Letters Patent.  Patented Jan. 2, 1917.

Application filed August 6, 1915. Serial No. 44,000.

*To all whom it may concern:*

Be it known that I, JOHN F. HUCKEL, a citizen of the United States, residing at Kansas City, in the county of Jackson and State of Missouri, have invented certain new and useful Improvements in Vending-Trucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a vending truck, and has for its principal object to provide a device which may be wheeled along a railway platform, and is adapted for conveniently carrying and advantageously displaying a maximum variety of vendible articles, such as cigars, food, confectionery, fruits, magazines, etc. In accomplishing this object I have provided improved details of structure, the preferred form of which is illustrated in the accompanying drawings, wherein:—

Figure I is a perspective view of a vending truck containing my improvements.

Fig. II is a transverse vertical section of the same.

Referring more in detail to the drawings:—1 designates a platform upon which the truck is mounted and which comprises front and rear ground wheels 2—3; the former having caster mounting on the platform so that the truck may be easily turned on a short radius, and the latter preferably mounted on a fixed axle 4.

Located above the platform 1 is a compartment 5; the sides 6 of which are inclined upwardly and inwardly from the edge of the platform, while the ends 8 follow the contour of the ends of the sides 6 and preferably project therebeyond to form trough sides 9. The trough construction is completed by a bottom rail 11 which is secured to a beam 12 that forms part of the platform, and to which the brackets 13 that carry the axle 4 are secured.

Mounted on the compartment 5 is a showcase 15, preferably comprising glass ends 16 and sliding side doors 17, through which contents of the case may be readily observed; shelving 18 being arranged within the case in order to increase the capacity thereof. The bottom, 19, of the showcase is preferably opaque to conceal the contents of the compartment 5, and the top 20 opaque and surrounded by a rail 21, so that vendible articles, of a nature that they will not be affected by exposure, may be supported on the top of the case. The frame of the showcase proper may be of any suitable construction that will give the required rigidity, and fixed to the ends of the case, preferably with their lower ends attached to the ends of the storage compartment, are handles 22 whereby the truck may be moved about on a station platform or elsewhere.

Rising from the top of the showcase, and preferably arranged along the longitudinal center thereof, is a rack 23, which may be of sufficient width to provide a storage compartment 24 between the sides thereof, and comprising end members having their edges projected beyond the sides to form rails that will confine articles, such as magazines, to the rack. The preferred construction comprises a rail 25 that extends horizontally along each of the side members of the rack and has a keeper bar 26 extending both upwardly and downwardly from the free edge of the rail to form a keeper that will overhang magazines in the lower tier and project over the lower edge of magazines supported on the rail; in this way increasing the capacity of the rack and preventing accidental displacement of the magazines.

Access is had to the compartments 5 and 24 through doors 28 and 29, which may be hingedly mounted in one or both ends of the compartment and rack and conceal the contents thereof, so that a reserve stock of vendible articles may be carried in one or both compartments.

Rising from the top of the rack are standards 31 having cross arms 32 which support reflectors 33, that overlie the rack space and contain illuminators 34, preferably of an electrical type and having connection (not shown) with batteries 36 preferably contained within the compartment 5, and to which access may be had through a trap door 37 in one of the side troughs.

I preferably form the sides of the compartment 5 of glass, in order that contents of the compartment may be viewed therethrough when the lower compartment is used as a show case; although the troughs may be used as containers or supports for magazines or the like. In either event the capacity of the truck is increased because of this added carrying space, and the efficiency is increased because with the inclined sides of the compartment the line of vision of an observer is at or near a right angle to said sides.

In using a truck of this description, candies, food, fruits, or the like, may be placed in the showcase, magazines or other bulkier articles in the upper rack and, if desired, magazines may be placed in the inclined side racks, so that a considerable variety and quantity of articles may be placed in and on the truck. With the truck so supplied it may be wheeled along a station platform, or in a street if desired, to carry the merchandise to the vicinity of passenger trains or to other places where possible purchasers may be; the exhibiting space of the truck making it possible to neatly and conveniently display a considerable variety of articles, and to protect the articles contained within the showcase.

As the showcase portion of the truck is completely inclosed, refrigeration apparatus (not shown) may be installed therein, so that food, milk, or other perishable commodities may be carried therein and kept in good condition even in hot weather.

Being equipped with a lighting system, the truck may be used at night, current for the lamps being furnished by the storage battery carried in the compartment 5, and which may be replaced, when necessary, through the trap door 39. It is apparent that the batteries may be carried elsewhere on the truck when the compartment is used as a show case.

Having thus described my invention, what I claim as new therein, and desire to secure by Letters-Patent, is:—

1. A showcase comprising a top member and a rack extending longitudinally along the top member and having spaced sides forming a compartment therebetween, and ends closing said compartments and projecting beyond the side of the rack and above the ends of the top to form confining rails.

2. A showcase comprising a top member and a rack extending longitudinally along the top member and having spaced sides forming a compartment therebetween, ends closing said compartments and projecting beyond the side of the rack and above the ends of the top to form confining rails, and edge rails along the top between said ends, forming horizontal and inclined troughs along the top of the case and sides of the rack.

3. A showcase comprising a top member and a rack extending longitudinally along the top member and having spaced sides forming a compartment therebetween, ends closing said compartments, and projecting beyond the sides of the rack and above the ends of the top to form confining rails, and edge rails along the top between said ends forming horizontal and inclined troughs along the top of the case and sides of the rack, and doors opening through said end members to the compartment within the rack.

In testimony whereof I affix my signature.

JOHN F. HUCKEL.

Copies of this patent may be obtained for five cents each, by addressing the "Commissioner of Patents Washington, D. C."